US008946131B2

(12) United States Patent
Nguyen et al.

(10) Patent No.: US 8,946,131 B2
(45) Date of Patent: Feb. 3, 2015

(54) METHODS AND COMPOSITIONS FOR CONSOLIDATING PARTICULATE MATTER IN A SUBTERRANEAN FORMATION

(71) Applicant: Halliburton Energy Services, Inc., Houston, TX (US)

(72) Inventors: Philip D. Nguyen, Houston, TX (US); Richard D. Rickman, Duncan, OK (US); Jimmie D. Weaver, Duncan, OK (US); Bhadra Desai, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/970,862

(22) Filed: Aug. 20, 2013

(65) Prior Publication Data
US 2013/0338254 A1    Dec. 19, 2013

Related U.S. Application Data

(62) Division of application No. 13/533,590, filed on Jun. 26, 2012, now Pat. No. 8,534,356, which is a division of application No. 12/380,319, filed on Feb. 25, 2009, now Pat. No. 8,261,833.

(51) Int. Cl.
| *C09K 8/575* | (2006.01) |
| *C08G 77/04* | (2006.01) |
| *C08K 5/5425* | (2006.01) |
| *C08K 5/544* | (2006.01) |
| *C08L 71/02* | (2006.01) |

(52) U.S. Cl.
CPC .............. *C09K 8/5751* (2013.01); *C08G 77/04* (2013.01); *C08K 5/5425* (2013.01); *C08K 5/544* (2013.01); *C08L 71/02* (2013.01)

USPC .......... 507/219; 507/233; 507/234; 507/260; 507/261; 507/263; 507/265; 523/131

(58) Field of Classification Search
None
See application file for complete search history.

(56) References Cited

U.S. PATENT DOCUMENTS

| 4,537,944 | A | * | 8/1985 | Imai et al. ................. 528/18 |
| 5,118,755 | A | * | 6/1992 | Endo et al. ................. 524/783 |
| 5,254,657 | A | * | 10/1993 | Inoue ................. 528/17 |
| 5,371,116 | A | * | 12/1994 | Sakamoto et al. ............... 522/33 |
| 6,008,290 | A | * | 12/1999 | Miyoshi et al. ................. 524/720 |
| 6,013,643 | A | * | 1/2000 | Sakamoto et al. ............ 514/188 |
| 6,914,110 | B2 | * | 7/2005 | Tsuji et al. ................. 526/222 |
| 8,534,356 | B2 | | 9/2013 | Nguyen et al. |
| 2005/0004318 | A1 | * | 1/2005 | Ohshiro et al. ............ 525/329.1 |
| 2006/0036008 | A1 | * | 2/2006 | Langezaal et al. ............ 524/261 |
| 2006/0149000 | A1 | * | 7/2006 | Ikuta et al. ................. 525/343 |
| 2006/0189736 | A1 | * | 8/2006 | Mori et al. ................. 524/404 |
| 2006/0194930 | A1 | * | 8/2006 | Bachon et al. ................. 525/449 |
| 2006/0287408 | A1 | * | 12/2006 | Baikerikar et al. ............. 522/71 |

FOREIGN PATENT DOCUMENTS

EP          819749 A2 *   1/1998

* cited by examiner

*Primary Examiner* — John J Figueroa
(74) *Attorney, Agent, or Firm* — McDermott Will & Emery LLP; Craig W. Roddy

(57) ABSTRACT

Curable adhesive compositions comprising a silane coupling agent; a polymer, the polymer having a reactive silicon end group; a catalyst operable to facilitate the curing of the polymer; and, a diluent and wherein the polymer comprises about 0.1% to about 30% by weight of the curable adhesive composition. The curable adhesive compositions may further comprise a dehydrating agent comprising a component selected from the group consisting of: vinyl trimethoxysilane, vinyl alkoxysilane, inorganic zeolites, and organic zeolites.

9 Claims, No Drawings

METHODS AND COMPOSITIONS FOR CONSOLIDATING PARTICULATE MATTER IN A SUBTERRANEAN FORMATION

BACKGROUND

The present invention relates to methods and compositions for treating subterranean formations. More particularly, the present invention relates to methods and compositions for consolidating particulate matter in a subterranean formation.

Hydrocarbon-producing wells are often stimulated by hydraulic fracturing treatments. Hydraulic fracturing operations generally involve pumping a fracturing fluid into a well bore that penetrates a subterranean formation at a hydraulic pressure sufficient to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The fracturing fluid may comprise particulates, often referred to as "proppant particulates," that are deposited in the fractures. The proppant particulates function, inter alia, to prevent the fractures from fully closing upon the release of hydraulic pressure, forming conductive channels through which fluids may flow to the well bore. After at least one fracture is created and the proppant particulates are substantially in place, the fracturing fluid may be "broken" (i.e., the viscosity of the fluid is reduced), and the fracturing fluid may be recovered from the formation.

Hydrocarbon-producing wells also may undergo gravel packing treatments, inter alia, to reduce the migration of unconsolidated formation particulates into the well bore. In gravel-packing treatments, a treatment fluid suspends particulates (commonly referred to as "gravel particulates") to be deposited in a desired area in a well bore, e.g., near unconsolidated or weakly consolidated formation zones, to form a gravel pack to enhance sand control. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid may be reduced to allow it to be recovered.

In some situations, fracturing and gravel-packing treatments are combined into a single treatment (commonly referred to as "frac-pack" operations). In such "frac-pack" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Occasionally, sand, gravel, proppant, and/or other unconsolidated particulates placed in the subterranean formation during a fracturing, gravel packing, or frac-pack operation may migrate out of the subterranean formation into a well bore and/or may be produced with the oil, gas, water, and/or other fluids produced by the well. The presence of such particulates, in produced fluids is undesirable in that the particulates may abrade pumping and other producing equipment and/or reduce the production of desired fluids from the well. Moreover, particulates that have migrated into a well bore (e.g., inside the casing and/or perforations in a cased hole), among other things, may clog portions of the well bore, hindering the production of desired fluids from the well. The term "unconsolidated particulates," and derivatives thereof, is defined herein to include loose particulates and particulates bonded with insufficient bond strength to withstand the forces created by the production of fluids through the formation. Unconsolidated particulates may comprise, among other things, sand, gravel, fines and/or proppant particulates in the subterranean formation.

One method of controlling unconsolidated particulates has been to produce fluids from the formations at low flow rates. The production of unconsolidated particulates may still occur, however, due to unintentionally high production rates and/or pressure cycling as may occur from repeated shut-ins and start ups of a well. Moreover, producing fluids from the formations at low flow rates may prove economically inefficient or unfeasible.

Another technique used to control unconsolidated particulates has been to coat the particulates with a tackifying agent or curable resin prior to their introduction into the subterranean formation and allowing the tackifying agent or resin to consolidate the particulates once inside the formation. In general, the tackifying agent or resin enhances the grain-to-grain, or grain-to-formation, contact between particulates and/or subterranean formation so that the particulates are stabilized, locked in place, or at least partially immobilized such that they are resistant to flowing with produced or injected fluids.

Yet another technique used to control particulates in unconsolidated formations involves application of a consolidation fluid containing resins or tackifying agents to consolidate particulates into a stable, permeable mass after their placement in the subterranean formation. These consolidation fluids may be preferentially placed in a particular region of a subterranean formation using isolation tools, such as "pack off" devices, packers, gel plugs, mechanical plugs, bridge plugs, ball sealers, and the like.

SUMMARY

The present invention relates to methods and compositions for treating subterranean formation. More particularly, the present invention relates to methods and compositions for consolidating particulate matter in a subterranean formation.

In one embodiment of the present invention, the invention provides a curable adhesive composition comprising a polymer having a reactive silicon end group, a catalyst operable to facilitate the curing of the polymer, a silane coupling agent, and a diluent.

In another embodiment of the present invention, the invention provides a method of treating a subterranean formation comprising: coating a curable adhesive composition comprising a silane coupling agent and a polymer having a reactive silicon end group onto proppant material; suspending the coated proppant material in a carrier fluid to form an proppant slurry; introducing the proppant slurry into a subterranean formation; and allowing the curable adhesive composition to at least partially consolidate the proppant material in the subterranean formation.

In yet another embodiment of the present invention, the invention provides a method of treating a subterranean formation comprising: introducing a pre-flush fluid into a subterranean formation; introducing a curable adhesive composition comprising a silane coupling agent and a polymer having a reactive silicon end group into the subterranean formation subsequent to the pre-flush fluid; introducing an aqueous post-flush fluid into the subterranean formation subsequent to the curable adhesive composition; and allowing the curable adhesive composition to at least partially consolidate particulate matter within the subterranean formation.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods and compositions for treating subterranean formations. More particularly, the present invention relates to methods and compositions for consolidating particulate matter within a subterranean formation.

Generally, the methods and compositions of the present invention may be used for primary treatments, remedial treatments, and/or proactive treatments of a subterranean formation. As used herein, "primary treatment" refers to any treatment in which a curable adhesive composition is coated onto particulate matter that is then placed into a subterranean formation, for example, in a fracturing, gravel-packing, or frac-pack treatment; "remedial treatment" refers to any treatment in which a curable adhesive composition is coated onto particulate matter that has been previously placed in a subterranean formation, for example, in a fracturing, gravel-packing, or frac-pack treatment; and "proactive treatment" refers to any treatment in which a curable adhesive composition is coated onto the surface of a subterranean formation prior to a treatment, such as a fracturing, gravel-packing, or frac-pack treatment, or that might introduce or produce unconsolidated particulates in the subterranean formation, for example, as a pre-pad to the fracturing treatment or in any diagnostic pumping stage performed prior to a fracturing, gravel packing, or acidizing procedure. Generally, whether a particular method of the present invention is "primary," "remedial," or "proactive" is determined relative to the timing of a fracturing, gravel-packing, or frac-pack treatment. Using the compositions and methods of the present invention, particulates within the formation may be consolidated into a cohesive, consolidated, yet permeable pack to minimize or reduce their production with production fluids, helping the particulates to better withstand drag forces caused by high production and/or injection flow rates.

One of the advantages of some embodiments of the present invention, many of which are not discussed herein, is that the compositions and methods of the present invention may be more economical than previous treatments employing epoxy-based or furan-based resins. The curable adhesive compositions may also pose fewer environmental or safety concerns than epoxy-based, furan-based, or other rubber-based adhesive compositions, which often contain solvents that are toxic and/or flammable. The curable adhesive compositions may also yield cohesive, yet relatively elastic, packs that may be able to withstand additional stresses.

Generally, the curable adhesive compositions of the present invention comprise a silane coupling agent and a polymer having a reactive silicon end group. In some embodiments, the curable adhesive composition may also include a catalyst operable to facilitate the curing of the polymer, a diluent, a dehydrating agent, and/or a filler material.

Generally, any suitable polymer that can be prepared with reactive silicon end groups may be used in accordance with particular embodiments of the present invention. Examples of suitable polymers include, but are not limited to, polyalkyls, such as polyethers, polyalkanes, polyalkenes, and polyalkynes; substituted alkyl monomers, such as styrene; acrylics; and combinations thereof. Examples of suitable reactive silicon end groups include, but are not limited to, triethoxysilanes, methyldiethoxysilanes, trisilanols, alkoxysilanes, substituted silanes, multi-silanols, and combinations thereof. One suitable polymer having a reactive silicon end group that may be used in particular embodiments of the present invention is a silane-modified poly(propylene oxide) oligomer.

Generally, the polymer having a reactive silicon end group may be present in the curable adhesive composition in an amount from about 10% to about 80% by weight of the composition. In particular embodiments of the present invention, the curable adhesive compositions used for primary treatments may generally contain a greater percentage of polymer having a reactive silicon end group than those compositions used for remedial or proactive treatments. For example, in some embodiments used for primary treatment, the polymer having a reactive silicon end group may be present in the curable adhesive composition in an amount from about 30% to about 80% by weight of composition. In particular primary treatment embodiments, the polymer having a reactive silicon end group may be present in the curable adhesive composition in an amount from about 40% to about 70% by weight of the composition. In other primary treatment embodiments, the polymer having a reactive silicon end group may comprise at least about 60% by weight of curable adhesive composition. In contrast, in some embodiments used for remedial and/or proactive tre atments, the polymer having a reactive silicon end group may be present in the curable adhesive composition in an amount from about 0.1% to about 30% by weight of the composition, and preferably in an amount from about 1% to about 10% by weight of the composition. With the benefit of this disclosure, it should be within the ability of one of ordinary skill in the art to select an appropriate amount of polymer having a reactive silicon end group for use in a particular application.

The curable adhesive composition may also comprise a silane coupling agent, which facilitates the adhesion of the curable adhesive composition to the particulates. Generally, any suitable silane coupling agent may be used in accordance with particular embodiments of the present invention. Examples of suitable silane coupling agents include, but are not limited to, N2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; gamma-glycidoxypropyltrimethoxysilanes; vinyltrichlorosilane; vinyltris(beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; 3-aminopropyl-triethoxysilane; N-phenyl-r-aminopropyltrimethoxysi lane; r-mercaptopropyltrimethoxysilane; r-chloropropyltrimethoxysilane; vinyltris(beta-methoxyethoxy) silane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)- r-aminopropylmethyldimethoxysilane; r-aminopropyltriethoxysilane; N-[3-(trimethoxysilyl)propyl]-ethylenediamine; substituted silanes where one or more of the substitutions contains a different functional group; and combinations thereof. In some embodiments, the silane coupling agent may be present in the curable adhesive composition in an amount from about 0.1% to about 5% by weight of the composition, and preferably in an amount from about 0.5% to about 3% by weight of the composition.

In some embodiments, the curable adhesive composition of the present invention may also comprise an optional catalyst to facilitate the curing of the adhesive composition. Generally, any suitable catalyst may be used in the curable adhesive compositions of the present invention. Examples of suitable catalysts include, but are not limited to, tertiary amine catalysts, titanium chelate catalysts, tin catalysts, lead catalysts, bismuth catalysts, and combinations thereof. One suitable catalyst that may be used in particular embodiments of the present invention is dibutylbis(2,4-pentanedionate-O, O')—, (OC-6-11). In some embodiments, the catalyst may be present in the curable adhesive composition in an amount from about 0.1% to about 5% by weight of the composition, and preferably in an amount from about 1% to about 3% by weight of the composition.

In some embodiments, the curable adhesive composition of the present invention may also include an optional diluent. In particular embodiments, the presence of a diluent helps reduce the viscosity of the curable adhesive composition to improve its flowability and enhance its coating effectiveness onto particulate matter. Generally, the curable adhesive composition may have a viscosity less than about 1,500 cP. In some embodiments, such as those used for primary treatments, the curable adhesive composition may have a viscosity in the range from about 250 cP to about 1,500 cP, and, preferably, from about 450 cP to about 800 cP. In other embodiments, such as those used for remedial or proactive treatments, the curable adhesive composition may have a viscosity less than about 50 cP, and, preferably, less than about 10 cP. Examples of suitable diluents include, but are not limited to, hydrocarbons, such as diesel and kerosene; polyglycols, such as polypropylene; mineral oils, such as white mineral oil and petroleum oil; vegetable oils, such as castor oil, corn oil, and peanut oil; tall oil fatty acids; monofunctional polyether polymers; phthalate plasticizers, such as butyl benzyl phthalate and diisodecyl phthalate; and combinations thereof. Generally, the diluent may be present in the curable adhesive composition in an amount from about 20% to about 70% by weight of the composition. In some embodiments, such as those for use in primary treatments, the diluent may be present in the curable adhesive composition in an amount from about 30% to about 60% by weight of the composition. In other embodiments, such as those for use in remedial or proactive treatments, the diluent may be present in the curable adhesive composition in an amount from about 70% to about 99% by weight of the composition, and preferably in an amount from about 85% to about 95% by weight of the composition.

In some embodiments, the curable adhesive composition may also include an optional dehydrating agent. Examples of suitable dehydrating agents include, but are not limited to, vinyl trimethoxysilane, any vinyl alkoxysilane, inorganic zeolites, organic zeolites, and combinations thereof. In some embodiments, the dehydrating agent may be present in the curable adhesive composition in an amount from about 0.1% to about 10% by weight of the composition, and preferably in an amount from about 0.5% to about 3% by weight of the composition.

Particular embodiments of the curable adhesive composition may also include an optional filler material to, among other things, help strengthen the adhesive composition. Examples of suitable filler materials include, but are not limited to, zinc oxide, reinforcing carbon black, non-reinforcing carbon black, semi-reinforcing carbon black, white carbon, expanded graphite powder, powdery graphite, crystalline silica, ground nut shells, silicates, chalk, calcium carbonate (including limestone), talc, mica, alumina, aluminum hydroxide, zirconia, titanium dioxide, wollastonite, feldspar, aluminum silicates, solid ceramic microspheres, hollow ceramic microspheres, hollow ceramic spheres, hollow plastic spheres, metal powders, metal microbeads, wood flour, dolomite, organic pigments, inorganic pigments, fumed amorphous silica (including hydrophilic and hydrophobic types), glass microbeads, glass fibers, clear polymer fibers, clear polymer microbeads, clear polymer powders, and combinations thereof. In some embodiments, the filler material may be present in the curable adhesive composition in an amount from about 1% to about 30% by weight of the composition, and preferably in an amount from about 2% to about 10% by weight of the composition.

In particular embodiments, the curable adhesive compositions of the present invention may be used in a primary method to coat particulate matter, such as proppant, that is then placed in the subterranean formation using a well treatment fluid, such as a fracturing fluid or gravel pack fluid. One example of such a method comprises coating a curable adhesive composition comprising a silane coupling agent and a polymer having a reactive silicon end group onto proppant material; suspending the coated proppant material in a carrier fluid to form a proppant slurry; introducing the proppant slurry into a subterranean formation; and allowing the curable adhesive composition to at least partially consolidate the proppant material once it is place into the subterranean formation. Another example of such a method comprises: providing a gravel pack fluid that comprises gravel coated with a curable adhesive composition, the curable adhesive composition comprising a silane coupling agent and a polymer having a reactive silicon end group; contacting a portion of the subterranean formation with the gravel pack fluid so as to place a gravel pack in or near a portion of the subterranean formation; and allowing the curable adhesive composition to consolidate the gravel once it is placed within the subterranean formation. The fracturing and/or gravel pack fluids in these primary embodiments may comprise any suitable component usually found in fracturing fluids in view of the characteristics of the formation including, but not limited to, an aqueous base fluid, proppant particulates, gelling agents, surfactants, breakers, buffers, a gas phase (if the fracturing fluid is foamed or commingled), coupling agents, and the like. One of ordinary skill in the art with the benefit of this disclosure will recognize the appropriate components for use in fracturing or gravel pack fluid for use in conjunction with a curable adhesive composition of the present invention for a given application.

In particular embodiments, the curable adhesive compositions of the present invention may be coated on particulates to be used in a fracturing or gravel packing process like those described above. As used herein, the term "coated" implies no particular degree of coverage or mechanism by which the consolidating agent becomes incorporated with the particulates. Moreover, as used herein, "coating" includes, but is not limited to, simple coating, adhesion, and impregnation. In particular embodiments of the present invention, this coating of the curable adhesive composition onto some or all of the particulates, as well as any mixing of the coated particulates with a fracturing or treatment fluid, may be performed "on-the-fly," in which a flowing stream is continuously introduced into another flowing stream so that the streams are combined and mixed while continuing to flow as a single stream. As is well understood by those skilled in the art, such mixing may also be accomplished by batch mixing or partial batch mixing. In particular embodiments, the curable adhesive composition may be coated onto dry particulates while the particulates are conveyed by a conveying and/or mixing device, such as a sandscrew or auger, into the fracturing or gravel packing fluid.

In particular embodiments of the present invention, the coated particulates may be introduced as part of a fracturing or gravel packing process at any point during a fracturing or gravel packing treatment. For example, in particular embodiments, the coated particulates may be introduced towards the end of a fracturing or gravel packing treatment so that the maximum economic benefit can be obtained. One of ordinary skill in the art will readily understand the economic value of placing the adhesive-coated particulates at only certain points during the placement of the particulates.

One of ordinary skill in the art will also appreciate the appropriate amount of curable adhesive composition to coat onto the particulate for a given application. In some embodiments, the amount of curable adhesive composition coated onto the particulates may be in the range from about 0.1% to about 20% by weight of the particulate. In particular embodiments, the amount of curable adhesive composition coated onto the particulates may be in the range of from about 1% to about 5% by weight of the particulate.

A wide variety of particulate materials may be used in accordance with the present invention, including, but not limited to, sand, bauxite, ceramic materials, glass materials, polymer materials, tetrafluoroethylene materials, nut shells, ground or crushed nut shells, seed shells, ground or crushed seed shells, fruit pit pieces, ground or crushed fruit pits, processed wood, composite particulates prepared from a binder with filler particulate including silica, alumina, fumed carbon, carbon black, graphite, mica, titanium dioxide, metasilicate, calcium silicate, kaolin, talc, zirconia, boron, fly ash, hollow glass microspheres, solid glass, and mixtures thereof. The particulate material used may have a particle size in the range from about 2 to about 400 mesh, U.S. Sieve Series. In particular embodiments, the particulate material may be graded sand having a particle size in the range from about 10 to about 70 mesh, U.S. Sieve Series. Preferred sand particle size distribution ranges may be one or more of 10-20 mesh, 20-40 mesh, 40-60 mesh, or 50-70 mesh, depending on the particle size and distribution of the formation particulates to be screened out by the particulate materials. Other particulates that may be suitable for use in subterranean applications also may be useful.

In particular embodiments, the curable adhesive compositions of the present invention may also be used to remediate proppant and other particulate matter that has previously been placed in a subterranean formation. For example, in some embodiments of the present invention, after a fracturing treatment or a gravel pack treatment has been performed, the curable adhesive compositions of the present invention may be introduced into an unconsolidated zone of a subterranean formation to stabilize particulates within the zone. The curable adhesive compositions may disperse any loose fines within a proppant pack in a fracture, move any fines away from the fracture (or near the well bore), stabilize gravel particulates around a screen, stabilize a screen failure, and/or lock the fines in the formation. In another remedial embodiment, the curable adhesive compositions of the present invention may be introduced into a subterranean formation that is producing unconsolidated particulate material as a result of, inter alia, depletion, water breakthrough, etc. The curable adhesive composition may stabilize and/or strengthen the weakly consolidated or unconsolidated particulates in the formation and thereby reduce their undesirable production. For such remedial treatments, the curable adhesive composition is generally more dilute than when used for primary treatments. For example, in particular embodiments used for remedial treatments, the curable adhesive may comprise from about 0.1% to about 30% by weight polymers having reactive silicon end groups, compared to about 30% to about 80% by weight polymers having reactive silicon end groups in a primary treatment.

The amount of curable adhesive composition to be used for a given remedial treatment may be determined based on the number of perforations in the well bore and/or the length of the perforated interval to be treated. For example, in some embodiments, the curable adhesive composition used to treat proppant previously placed in fractures is generally used in an amount from about 1.25 to about 5 gallons per foot of the perforated interval to be treated. In some embodiments, the curable adhesive composition is used in an amount from about 2.5 to about 5 gallons per foot of the perforated interval to be treated. This amount assumes that each one-foot interval includes approximately 2 fractures, and that each fracture is to be treated to a depth of approximately 10 feet into the fracture. Depending on the number of fractures to be treated and the depth to which it is desired to treat the fractures, more or less curable adhesive composition may be used. With the benefit of this disclosure, one of ordinary skill in the art should be able to determine a suitable amount of curable adhesive composition to use to remedially treat a particular subterranean formation.

In some embodiments, the curable adhesive compositions of the present invention may also be used in a proactive treatment. Such treatments may be best suited for wells that have not been fractured or gravel packed. These methods may be used as a pre-treatment before a fracturing treatment or at the early stage of a fracturing treatment (including diagnostic pumping) as a pre-pad treatment. In some proactive embodiments of the present invention, the curable adhesive composition of the present invention may be introduced into an unconsolidated zone of a subterranean formation to stabilize particulates within the zone. In some embodiments, the proactive methods of the present invention comprise placing the curable adhesive composition before or as part of a pre-pad of a fracturing treatment into a subterranean formation. Similar to remedial treatments, for such proactive treatments, the curable adhesive composition is generally more dilute than when used for primary treatments. For example, in particular embodiments used for proactive treatments, the curable adhesive may comprise from about 0.1% to about 30% by weight polymers having reactive silicon end groups, compared to about 30% to about 80% by weight polymers having reactive silicon end groups in a primary treatment. In particular embodiments, the amount of curable adhesive composition used to proactively treat a subterranean formation may range from about 10 gallons per foot of formation interval to be treated to about 200 gallons per foot of formation interval to be treated. Preferably, the curable adhesive composition used to proactively treat a subterranean formation may range from about 30 gallons per foot of formation interval to be treated to about 100 gallons per foot of formation interval to be treated. With the benefit of this disclosure, one of ordinary skill in the art should be able to determine a suitable amount of curable adhesive composition to use to proactively treat a particular subterranean formation.

In some embodiments, subsequent to placing the curable adhesive composition in the formation, the subterranean formation may be fractured. This fracturing step may include the introduction of a plurality of particulates into the formation. In some embodiments, at least a portion of the particulates may be coated with a consolidating agent, such as the curable adhesive compositions of the present invention. In some embodiments, the coated particulates may be introduced into the fluid at the end of the fracturing treatment. In some embodiments, at least a plurality of the particulates may be of a larger size, such that the fracture has a higher conductivity. For example, the size of at least a plurality of the particulates may have a weight mean particle size ("d50") of about 20 times to about 50 times the d50 of the formation particulates.

In some embodiments, the curable adhesive compositions of the present invention may be used in a supported open-hole well bore. In supported open-hole well bores, a slotted liner or screen, for example, may be used to provide mechanical support and/or to allow the bore hole to conform and/or comply to the liner in very weak formation layers. In addition, in some supported open-hole well bores, zonal isolation packers may also be used. It may be desirable in certain embodiments to use the curable adhesive composition of the present invention in a supported open-hole well bore. One potential advantage of using the curable adhesive compositions of the present invention in a supported open hole well bore is that the formation around the well bore may be stabilized, thus mitigating any fines movement or long term plugging, such that the placement of a gravel pack may no longer be necessary.

In some remedial and proactive treatments, the application of the curable adhesive composition may be preceded by the application of a pre-flush fluid. Such a pre-flush fluid may help to remove debris from the flow path, displace reservoir fluids, and/or precondition the surface of the particulate matter for accepting the adhesive coating in the curable adhesive composition. Examples of suitable pre-flush fluids include aqueous and solvent-based fluids. In some embodiments, aqueous pre-flush fluid may comprise fresh water, saltwater (e.g., water containing one or more salts dissolved therein), brine (e.g., saturated saltwater), seawater, or combinations thereof, and may be from any source, provided that they do not contain components that might adversely affect the stability and/or performance of the consolidation fluids of the present invention. In other embodiments, solvent-based fluids may comprise a glycol ether solvent, such as diethylene glycol monomethyl ether, diethylene glycol dimethyl ether, ethylene glycol monobutyl ether, or dipropylene glycol monomethyl ether.

In some remedial or proactive treatments, application of the curable adhesive composition may be followed by the application of a post-flush fluid. Such a post-flush fluid may help remove excess curable adhesive composition from the pore spaces between the particulates and/or reduce permeability loss in the consolidated pack. Examples of suitable post-flush fluids include, but are not limited to, gases, such air and nitrogen, foamed aqueous fluids, such as brine, and hydrocarbon fluids, such as diesel and kerosene. In particular embodiments where a gaseous post-flush fluid is applied, the fluid may be applied in an amount from about 25 to about 200 cubic feet per foot of perforated interval to be treated depending on the temperature and pressure at the interval of interest. In other embodiments, where a foamed post-flush fluid is applied, the fluid may be applied in an amount from about one to two times the volume of the curable adhesive composition applied. With the benefit of this disclosure, one of ordinary skill in the art should be able to determine an appropriate amount of post-flush fluid to apply in a given remedial or proactive treatment.

In general, when used in a remedial or proactive treatment, the curable adhesive compositions, pre-flush fluids, and/or post-flush fluids of the present invention may be bullheaded into the well, i.e., pumped into the well bore without the use of isolation tools or barrier devices under the assumption that the fluid will be placed into a target area, or placed using coiled tubing or jointed pipe to treat intervals of interest. In some embodiments, mechanical isolation devices and packers may be used in combination with coiled tubing or jointed pipe to divide the well bore into shorter intervals. A pressure pulsing tool or rotating jetting tool may also be coupled with the coiled tubing or jointed pipe to enhance the placement of the fluid into an interval. For example, a pressure pulsing tool based on fluid-oscillation may be used to create pulsating pressure waves within the well bore and formation fluids to enhance the penetration of the treatment fluids further into the fractures and formations.

After application of the curable adhesive composition and any pre-flush or post-flush fluids, the well may be shut in for a period of time to allow the curable adhesive to cure. The amount of time necessary for the adhesive to cure sufficiently may depend on temperature and/or the composition of the adhesive. In some embodiments, positive pressure may be maintained in the well bore during shut in to prevent or reduce fluid swabbing into the well bore from the formations surrounding the well bore. Similarly, positive pressure may be maintained in the well bore during the removal of the equipment used to place the curable adhesive composition, pre-flush fluid, and/or post-flush fluid to similarly prevent or reduce fluid swabbing.

As stated above, the remedial and/or proactive treatments of the present invention may be employed in any subterranean treatment where unconsolidated particulates may reside in the formation. These unconsolidated particulates may comprise, among other things, sand, gravel, fines and/or proppant particulates within the open space of one or more fractures in the subterranean formation (e.g., unconsolidated particulates that form a proppant pack or gravel pack within the formation). Using the curable adhesive compositions and methods of the present invention, the unconsolidated particulates within the formation may be remedially or proactively treated to consolidate the particulates into a cohesive, consolidated, yet permeable pack and minimize or reduce their production with production fluids. For example, in some embodiments, the curable adhesive composition, pre-flush fluid, and/or post-flush fluid may be applied to remedially treat a gravel pack or frac-pack that has failed due to screen damage (often caused by screen erosion) to reduce the production of gravel, proppant, or formation sand with the production fluid. In one embodiment, the present invention provides a method of treating a subterranean formation comprising introducing a pre-flush fluid into a subterranean formation; introducing a curable adhesive composition comprising a silane coupling agent and a polymer having a reactive silicon end group into the subterranean formation subsequent to the pre-flush fluid; introducing an aqueous post-flush fluid into the subterranean formation subsequent to the curable adhesive composition; and allowing the curable adhesive composition to at least partially consolidate particulate matter within the subterranean formation.

To facilitate a better understanding of the present invention, the following examples of specific embodiments are given. In no way should the following examples be read to limit or define the entire scope of the invention.

Example 1

A curable adhesive composition was prepared by mixing 35 cc silane-modified poly(propylene oxide) oligomer; 0.5 cc dibutylbis(2,4-pentanedionate-O,O')—, (OC-6-11); 1 cc N-[3-(trimethoxysilyl)propyl]-ethylenediamine; 15 cc diesel; and 0.5 cc vinyltrimethoxysilane into a homogeneous solution. Six cc of this curable adhesive composition was then dry coated onto 200 g of 20/40-mesh Brady sandy (i.e., 3% v/w) using a spatula. The coated sand was then suspended and mixed in 300 cc of 3% KCl brine to form a coated sand slurry, in which the coated sand became tacky. The brine was decanted, and the coated sand was packed into a 5 inch-long brass cylinder having an inner diameter of 1 3/8 inches. The top and bottom of the brass chamber were capped to form a sealed system, which was then placed in an oven and cured at 200° F. for 20 hours.

After curing, a firm sand pack was extruded from the brass chamber and cut into sized cores approximately 1 3/8 inches in diameter and 2 inches in length for unconfined compressive strength ("UCS") measurements. It was observed that the cores were very elastic. The cores never crumbled or crushed even after their original lengths were reduced more than 25%. Once the stress load was removed, the cores returned to their original lengths. This process was repeated at least three times. The highest UCS value obtained was 90 psi.

Example 2

A curable adhesive composition was prepared by mixing 20 cc silane-modified poly(propylene oxide) oligomer; 1 cc dibutylbis(2,4-pentanedionate-O,O')—, (OC-6-11); 2 cc N-[3-(trimethoxysilyl)propyl]-ethylenediamine; 80 cc diesel; and 1 cc vinyltrimethoxysilane into a homogeneous solution.

A sand pack of 20/40-mesh Brady sand was dry packed into a brass 5 inch-ling brass cylinder having an inner diameter of 1 3/8 inches using a 60-mesh wire mesh screen placed at the bottom of the cylinder to hold the sand in place. The resultant sand column was then saturated with diesel by flushing 3 pore volumes (150 cc) of diesel through the column. Next, a pore volume (50 cc) of the curable adhesive composition was flushed through the sand column. A post-flush of 2 pore volumes (100 cc) of 3% KCl brine was then flushed through the sand column. The top and bottom of the brass chamber were capped to form a sealed system, which was then placed in an oven and cured at 200° F. for 20 hours.

After curing, a firm sand pack was extruded from the brass chamber and cut into sized cores approximately 1 3/8 inches in diameter and 2 inches long for UCS measurements. It was observed that the cores were very elastic. The cores never crumbled or crushed even after their original lengths were reduced more than 25%. Once the stress load was removed, the cores returned to their original lengths. The highest UCS value obtained was 25 psi.

Example 3

A curable adhesive composition was prepared by mixing 15 cc silane-modified poly(propylene oxide) oligomer; 1 cc dibutylbis(2,4-pentanedionate-O,O')—, (OC-6-11); 2 cc N-[3-(trimethoxysilyl)propyl]-ethylenediamine; 85 cc diesel; and 1 cc vinyltrimethoxysilane into a homogeneous solution.

A sand pack of 20/40-mesh Brady sand was dry packed into a 5 inch-long brass cylinder having an inner diameter of 1 3/8 inches using a 60-mesh wire mesh screen placed at the bottom of the chamber to hold the sand in place. The resultant sand column was then saturated with diesel by flushing 3 pore volumes (150 cc) of diesel through the column. Next, a pore volume (50 cc) of the curable adhesive composition was flushed through the sand column. A post-flush of 2 pore volumes (100 cc) of 3% KCl brine was then flushed through the sand column. The top and bottom of the brass cylinder were capped to form a sealed system, which was then placed in an oven and cured at 200° F. for 20 hours.

After curing, a firm sand pack was extruded from the brass cylinder and cut into sized cores approximately 1 3/8 inches in diameter and 2 inches long for UCS measurements. It was observed that the cores were very elastic. The cores never crumbled or crushed even after their original lengths were reduced more than 25%. Once the stress load was removed, the cores returned to their original lengths. The highest UCS value obtained was 8 psi.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A curable adhesive composition comprising:
   a silane coupling agent;
   a polymer comprising about 0.1% to about 30% by weight of the curable adhesive composition, the polymer having a reactive silicon end group;
   a catalyst operable to facilitate the curing of the polymer; and
   a viscosity-reducing diluent, the viscosity-reducing diluent comprising about 20% to about 70% by weight of the curable adhesive composition;
   wherein the viscosity-reducing diluent comprises a component selected from the group consisting of hydrocarbons, diesel, kerosene, polyglycols, polypropylene glycol, mineral oils, white mineral oil, petroleum oil, vegetable oil, castor oil, corn oil, peanut oil, tall oil fatty acids, and monofunctional polyether polymers.

2. The curable adhesive composition of claim 1, wherein the silane coupling agent comprises a component selected from the group consisting of N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilane; aminoethyl-N-beta-(aminoethyl)-gamma-aminopropyl-trimethoxysilane;

gamma-ureidopropyl-triethoxysilane; beta-(3,4-epoxy-cyclohexyl)-ethyltrimethoxysilane; gamma-glycidoxypropyltrimethoxysilane; vinyltris(beta-methoxyethoxy)silane; vinyltriethoxysilane; vinyltrimethoxysilane; 3-methacryloxypropyltrimethoxysilane; beta-(3,4-epoxycyclohexyl)-ethyl-trimethoxysilane; r-glycidoxypropyltrimethoxysilane; r-glycidoxypropylmethyldiethoxysilane; N-beta-(aminoethyl)-r-aminopropyl-trimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltrichlorosilane; r-methacryloxypropyltrimethoxysilane; r-aminopropyltriethoxysilane; N-[3-(trimethoxysilyl)propyl]-ethylenediamine; and substituted silanes where one or more of the substitutions contains a different functional group.

3. The curable adhesive composition of claim 1, wherein the polymer comprises a component selected from the group consisting of polyalkyl oxides, polyethers, polyalkanes, polyalkenes, polyalkynes, substituted alkyl monomers, styrenes, acrylics, and combinations thereof.

4. The curable adhesive composition of claim 1, wherein the reactive silicon end group comprises a component selected from the group consisting of triethoxysilanes, methyldiethoxysilanes, trisilanols, alkoxysilanes, substituted silanes, and multi-silanols.

5. The curable adhesive composition of claim 1, wherein the catalyst operable to cure the polymer comprises a component selected from the group consisting of tertiary amine catalysts, titanium chelate catalysts, tin catalysts, lead catalysts, and bismuth catalysts.

6. The curable adhesive composition of claim 1, wherein the catalyst comprises dibutylbis(2,4-pentanedionate-O, O')—, (OC-6-11).

7. The curable adhesive composition of claim 1, wherein the catalyst comprises from about 0.1% to about 5% by weight of the curable adhesive composition.

8. The curable adhesive composition of claim 1, wherein the curable adhesive composition further comprises a dehydrating agent comprising a component selected from the group consisting of vinyl trimethoxysilane, vinyl alkoxysilane, inorganic zeolites, and organic zeolites.

9. The curable adhesive composition of claim 1, further comprising a filler material selected from the group consisting of zinc oxide, reinforcing carbon black, non-reinforcing carbon black, semi-reinforcing carbon black, white carbon, expanded graphite powder, powdery graphite, crystalline silica, ground nut shells, silicates, chalk, calcium carbonate, talc, mica, alumina, aluminum hydroxide, zirconia, titanium dioxide, wollastonite, feldspar, aluminum silicates, solid ceramic microspheres, hollow ceramic microspheres, hollow ceramic spheres, hollow plastic spheres, metal powders, metal microbeads, wood flour, dolomite, organic pigments, inorganic pigments, fumed amorphous silica, glass microbeads, glass fibers, clear polymer fibers, clear polymer microbeads, clear polymer powders, and combinations thereof.

* * * * *